(12) United States Patent
Kato

(10) Patent No.: US 7,024,740 B2
(45) Date of Patent: Apr. 11, 2006

(54) ROTATING TABLE APPARATUS

(75) Inventor: Heizaburo Kato, Shizuoka (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/030,547

(22) Filed: Jan. 6, 2005

(65) Prior Publication Data

US 2005/0150093 A1 Jul. 14, 2005

Related U.S. Application Data

(63) Continuation of application No. 10/007,274, filed on Oct. 22, 2001, now Pat. No. 6,862,786.

(30) Foreign Application Priority Data

Oct. 25, 2000 (JP) .............................. 2000-325631

(51) Int. Cl.
B23B 29/32 (2006.01)
B23B 7/04 (2006.01)
(52) U.S. Cl. .............................. 29/43; 29/42; 29/38 B; 74/814; 74/820; 74/84 R
(58) Field of Classification Search ................ 29/38 B, 29/38 C, 56.5 R, 42–44, 33 J; 74/813 R, 74/813 L, 813 C, 820, 826, 84 R, 814
See application file for complete search history.

(56) References Cited

U.S. PATENT DOCUMENTS

| 3,049,017 A | 8/1962 | McDonald et al. |
| 3,456,529 A | 7/1969 | Petroff |
| 3,750,494 A | 8/1973 | Rice |
| 3,850,051 A | 11/1974 | Woltjen et al. |
| 4,132,414 A | 1/1979 | Dinsdale |
| 4,333,363 A | 6/1982 | Inaba et al. |
| 4,444,534 A | 4/1984 | Bergman |
| 4,656,951 A | 4/1987 | Kimura et al. |
| 4,684,114 A * | 8/1987 | Bell, Sr. ...................... 74/820 |
| 4,896,560 A | 1/1990 | Kato |
| 5,097,718 A | 3/1992 | Sahara |
| 5,123,149 A | 6/1992 | Togawa et al. |
| 5,170,678 A | 12/1992 | Wawrzyniak et al. |
| 5,243,869 A | 9/1993 | Kukowski |
| 5,599,108 A | 2/1997 | Ochiai et al. |

(Continued)

FOREIGN PATENT DOCUMENTS

GB          608048          9/1948

(Continued)

OTHER PUBLICATIONS

Wills; "Lubrication Fundamentals"; Mercel Dekker, Inc., 1980; pp. 88-93 and 132-134.

(Continued)

*Primary Examiner*—Erica Cadugan
(74) *Attorney, Agent, or Firm*—Harness, Dickey & Pierce, P.L.C.

(57) ABSTRACT

A rotating table apparatus using a cam mechanism and having a higher precision than a conventional rotating table is realized. A rotating table apparatus having a driven shaft supported by a housing and driven by a driving device, and a rotating table which is rotatingly driven by said driven shaft using a cam and cam followers, wherein the rotating table apparatus has an opposing surface which opposes an end surface of the rotating table in a direction along a rotation shaft of said rotating table, and oil is intervened in between the opposing surface and said end surface.

10 Claims, 12 Drawing Sheets

U.S. PATENT DOCUMENTS 5,806,367 A    9/1998   Kato
6,279,219 B1   8/2001   Ohsawa
6,324,943 B1   12/2001  Sahara

FOREIGN PATENT DOCUMENTS

| | | |
|---|---|---|
| JP | 64-30965 A | 2/1989 |
| JP | 2-37156 | 12/1991 |
| JP | 6-207653 A | 7/1994 |
| KR | 97-4513 | 2/1997 |

OTHER PUBLICATIONS

Bhusan; "Modern Tribology Handbook, vol. One, Principles of Tribology"; CRC Press; 2001; Chapters 11 and 12.

* cited by examiner

ROTATING TABLE APPARATUS

CROSS-REFERENCE TO RELATED APPLICATIONS

This application is a continuation of U.S. patent application Ser. No. 10/007,274 filed on Oct. 22, 2001, now U.S. Pat. No. 6,862,786, which claims the benefit of Japanese Patent Application No. 2000-325631 filed Oct. 25, 2000. The disclosure(s) of the above application(s) are incorporated herein by reference.

BACKGROUND OF THE INVENTION

1. Field of the Invention

The present invention relates to a rotating table apparatus, and particularly relates to a rotating table apparatus having a driven shaft supported by a housing and driven by a driving means, and a rotating table which is rotatingly driven by the driven shaft using a cam and cam followers.

2. Description of the Related Art

As a rotating table apparatus used for a conventional machine tool or the like, there is known a rotating table apparatus which attaches a worm wheel to a rotating table, gears a worm with this worm wheel, and rotatingly drives the rotating table by the rotation of the worm.

In such a rotating table apparatus, the worm deceleration mechanism has an inherent back-lash which may not be avoided due to its mechanism thereof. Therefore, various problems due to this back-lash, for example, when precise positioning of the rotating table is necessary, positioning is conducted by determining the rotation direction as one way, and further after the positioning there was a problem such as a clamp mechanism of a rotating table becoming separately needed.

SUMMARY OF THE INVENTION

In order to solve the above problems, there is proposed a rotating table apparatus using a cam mechanism. As the rotating table apparatus using the cam mechanism, for example there is a rotating table apparatus described in Japanese Utility Model Application No. Hei 3-126545. With this rotating table apparatus, by using the cam mechanism, various problems accompanying back-lash may be solved.

However, there is a large need for high precision of the rotating table apparatus, and a rotating table apparatus which may realize a higher precision is desired.

In the present invention, the object is to realize a rotating table apparatus with higher precision than a conventional rotating table.

A first invention in order to achieve the above object is a rotating table apparatus having a driven shaft supported by a housing and driven by a driving means, and a rotating table which is rotatingly driven by the driven shaft using a cam and cam followers; wherein
the rotating table apparatus has an opposing surface which opposes an end surface of the rotating table in a direction along the rotation shaft of the rotating table, and oil is intervened in between the opposing surface and the end surface.

A second invention in order to achieve the above object, in addition to the characteristics of the first invention, is a rotating table apparatus wherein there is provided a space in between the opposing surface and the end surface which is 0.005 mm or more and 0.2 mm or less.

A third invention in order to achieve the above object, in addition to the characteristics of the first and the second invention, is a rotating table apparatus wherein the opposing surface is a part of the housing.

A fourth invention in order to achieve the above object, in addition to the characteristics of any of the first to third inventions, is a rotating table apparatus wherein oil for lubricating the cam and the cam followers is provided in the housing, and a portion of oil intervenes in between the opposing surface and the end surface.

A fifth invention in order to achieve the above object, in addition to the characteristics of any of the first to fourth inventions, is a rotating table apparatus wherein the cam is a roller gear cam and the rotating table intermittently rotates.

A sixth invention in order to achieve the above object, in addition to the characteristics of any of the first to fifth inventions, is a rotating table apparatus wherein a tool is provided in the rotating table.

A seventh invention in order to achieve the above object, in addition to the characteristics of any of the first to fifth inventions, is a rotating table apparatus wherein the rotating table is provided with a chuck for chucking a workpiece to be a processing object.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF PREFERRED EMBODIMENTS

Figure 1:
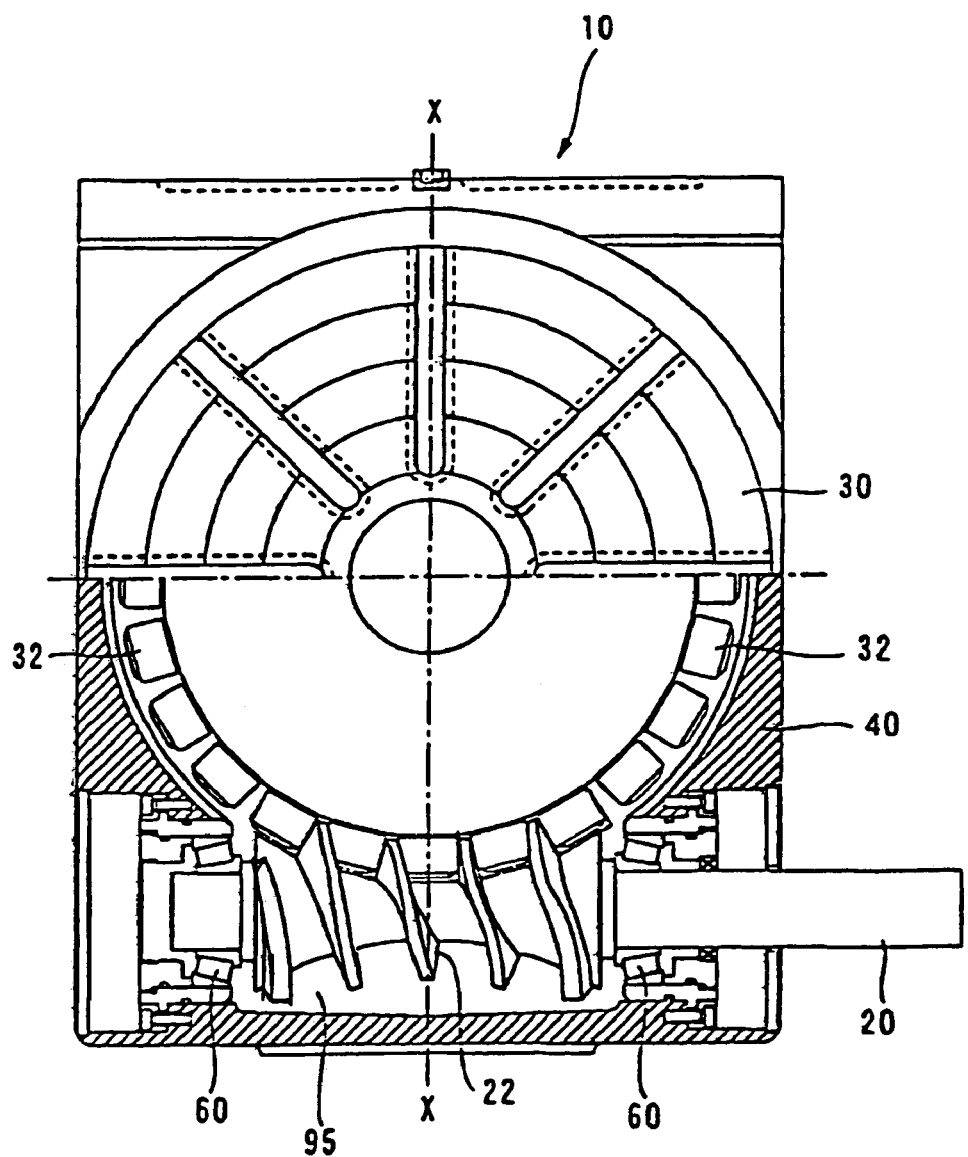
FIG. 1 is a plan view showing a structure of a rotating table apparatus according to Embodiment 1.
Figure 2:
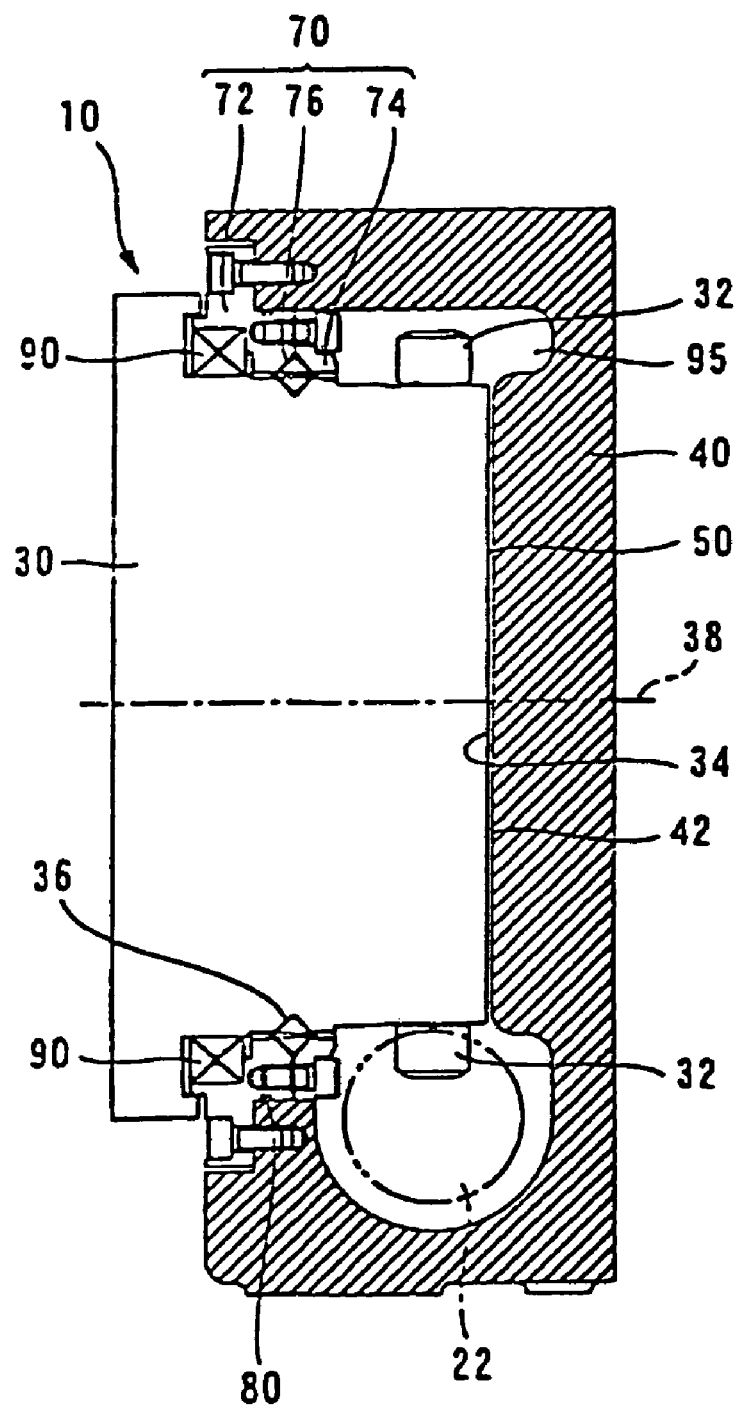
FIG. 2 is a cross sectional view along the line X—X in FIG. 1.

A first embodiment (Embodiment 1) of the present invention is with reference to FIGS. 1 and 2 in which a structure of a rotating table apparatus 10 is described.

A driven shaft 20 is rotatably supported in respect to a housing 40. This driven shaft 20 is provided with a roller gear cam 22 as a cam.

A rotating table 30 is rotatably supported in respect to the housing 40 by a second bearing 70, with a rotation shaft 38 as the center. The second bearing 70 is structured by a first race 72, a second race 74, a roller 76, and a V groove 36 formed in the rotating table 30, and the second bearing 70 functions as a cross roller bearing.

Here, the first race 72 is fixed to the housing 40 by bolts, and the second race 74 is fixed to the first race 72 by bolts. Forming the V groove 36 in the rotating table 30 and structuring the second bearing 70 in this way is preferable in a view of increasing the supporting precision of the rotating table 30 in respect to the housing 40. However, the rotating table 30 may be supported by using a general cross roller bearing or a bearing such as a ball bearing.

The rotating table 30 is provided with a plurality of cam followers 32 radially in the peripheral portion. These cam followers 32 gear with the roller gear cam 22 provided in the driven shaft 20.

The gap portion 95 in the housing 40 is provided with oil for lubricating the roller gear cam 22 and the cam followers 32. This oil is prevented from leaking outside of the rotating table apparatus 10 by a seal 90 and an O ring 80.

An opposing surface 42, opposing the end surface 34 along the direction of the rotation shaft 38 of the rotating table 30 is provided, and a space 50 is formed in between the end surface 34 and the opposing surface 42. In this embodiment, the opposing surface 42 is formed by a portion of the housing 40 protruding in a direction along the rotation shaft 38, but the opposing surface 42 may be formed by fixing a separate member to the housing 40. However, it is more advantageous in view of cost, to form the opposing surface 42 from a portion of the housing 40 which protrudes in a direction along the rotation shaft 38. Further, in order to realize the high precision of the rotating table apparatus, it is most preferable if the space 50 is 0.005 mm or more and 0.2 mm or less.

Further, this space 50 is linked with the gap portion 95, so that a portion of oil provided in the gap portion 95 flows in to the space 50. In this embodiment, by the space 50 being linked with the gap portion 95, the rotating table apparatus 10 is simplified, but if it is such a structure that oil is present in the space 50, the space and the gap portion do not necessarily have to be linked.

Operation of the rotating table apparatus 10 will now be described.

When the driven shaft 20 is driven by a driving means not shown such as a motor, the driven shaft 20 rotates in respect to the housing 40. The roller gear cam 22 also rotates when the driven shaft 20 rotates, and via the cam followers 32 gearing with the roller gear cam 22, the rotation driving force is transmitted to the rotating table 30, and thus the rotating table 30 rotates with the rotation shaft 38 as the center.

In this way, when the driven shaft 20 is driven and the rotating table 30 rotates, the rotating table 30 conducts a slight oscillation. In this embodiment, as described above, oil is intervened in between the end surface 34 of the rotating table 30 and the opposing surface 42, this oil functions as a damper, and swiftly decreases the oscillation generated in the rotating table 30. As a result, the high precision of the rotating table apparatus 10 may be realized.

In particular, when the roller gear cam 22 and the cam followers 32 which gear therein are used to intermittently rotate the rotating table 30, the oscillation when stopping and at time of stopping swiftly decreases as well as there being no deterioration of precision at stopping caused by back-lash. Thus, an intermittent rotating table apparatus with high precision may be realized, regardless of whether the rotating table 30 is rotating, is stopped or is at time of stopping, therefore it is extremely effective.

Figure 3:
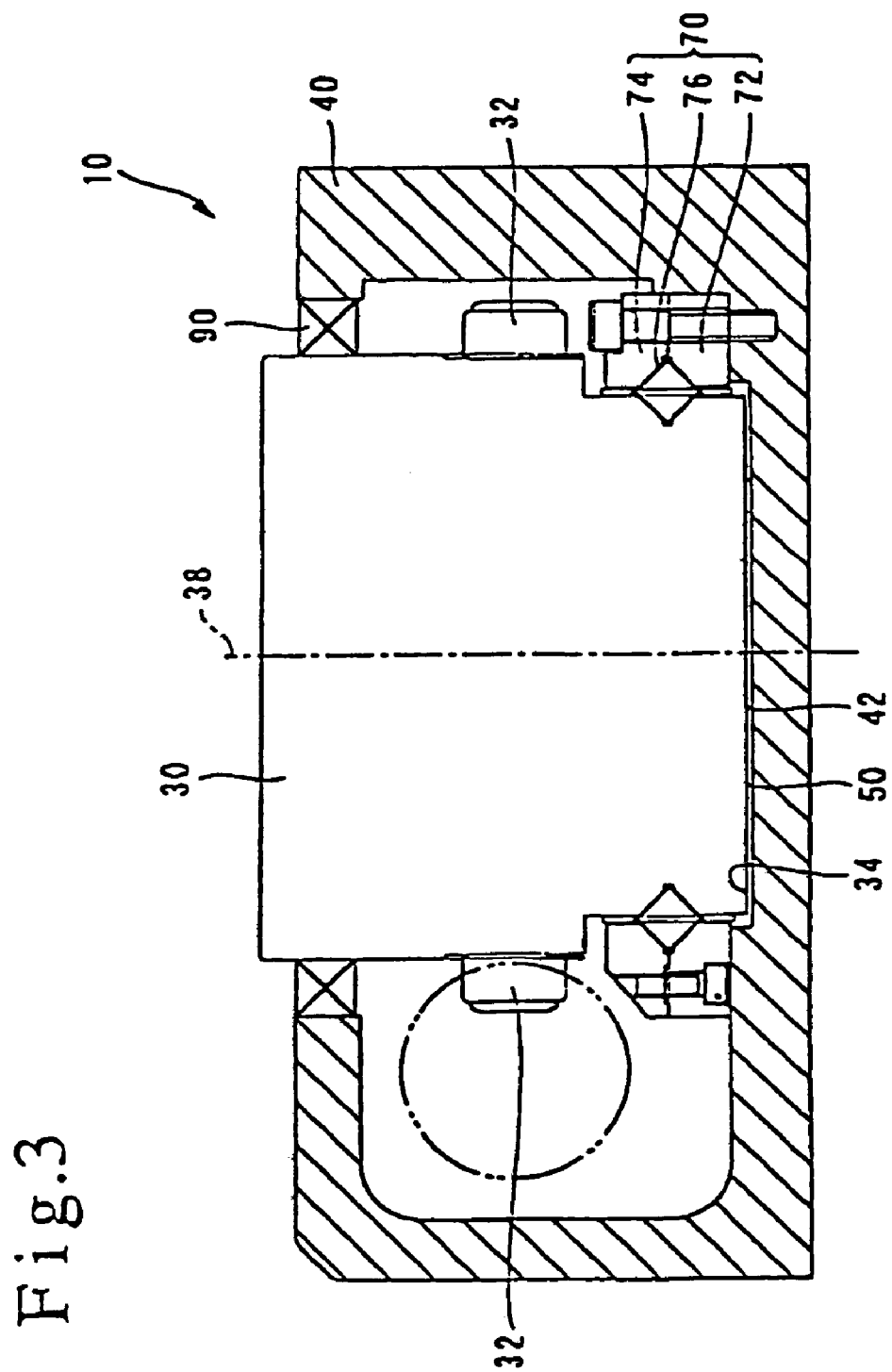
FIG. 3 is a cross sectional view showing a structure of a rotating table apparatus according to Embodiment 2.

A second embodiment (Embodiment 2) of the present invention will now be described with reference to FIG. 3.

According to this embodiment, a positional relationship of cam followers 32 and a second bearing 70 in a direction of a rotation shaft 38 of a rotating table 30 differs to Embodiment 1, and other structures are similar to those in Embodiment 1.

In the above described Embodiment 1, the cam followers 32 are placed in a position nearer to a space 50 than the second bearing 70 in the direction of the rotation shaft 38 of the rotating table 30. But in this embodiment, in a direction along the rotation shaft 38, the second bearing 70 is in a position closer to the space 50 than the cam followers 32. According to this embodiment, oil intervened between an end surface 34 of the rotating table 30 and an opposing surface 42 functions as a damper, and may swiftly decrease the oscillation generated in the rotating table 30. As a result, the high precision of the rotating table apparatus 10 may be realized.

Figure 4:
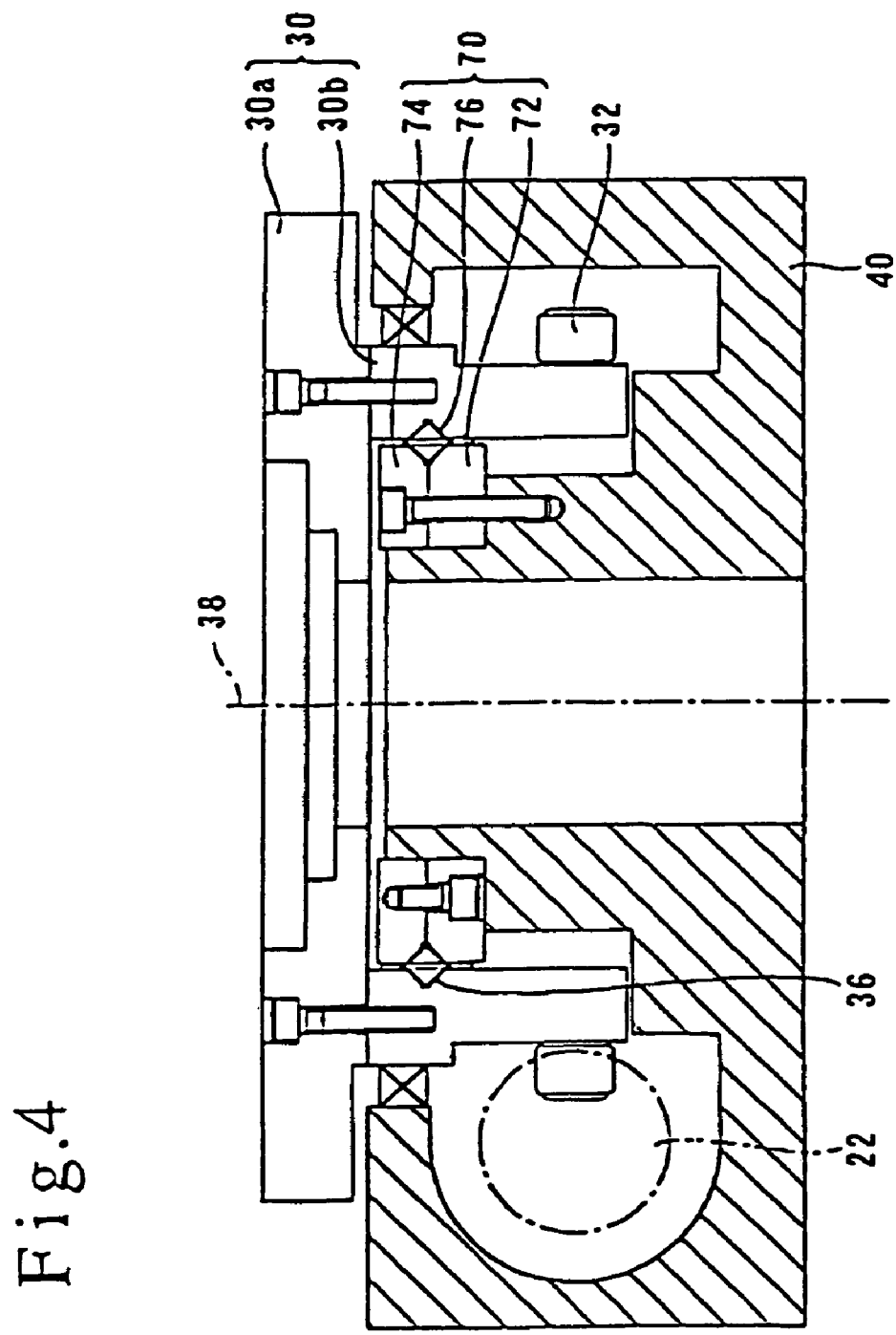
FIG. 4 is a cross sectional view showing a structure of a table apparatus according to Embodiment 3.

A third embodiment (Embodiment 3) will now be described with reference to FIG. 4. According to this embodiment, a structure of a rotating table 30 and a structure of a second bearing 70 differ to that of Embodiment 1, and other structures are the same as those in Embodiment 1. In this embodiment, the rotating table 30 comprises a top rail body 30a and a bottom rail body 30b, and both are held by bolts. Further, the second bearing 70 is structured by a V groove 36 formed in an inner surface of the 30b, a first race 72 fixed to a housing 40 by bolts, a second race 72 fixed to the first race 72 by bolts, and a roller 76.

This embodiment is a preferred embodiment in a case the rotating table 30 has a large diameter. Also in this embodiment, oil intervened between an end surface 34 of the rotating table 30 and an opposing surface 42 functions as a damper, and may swiftly decrease the oscillation generated in the rotating table 30. As a result, a high precision of a rotating table apparatus 10 may be realized.

Figure 5:
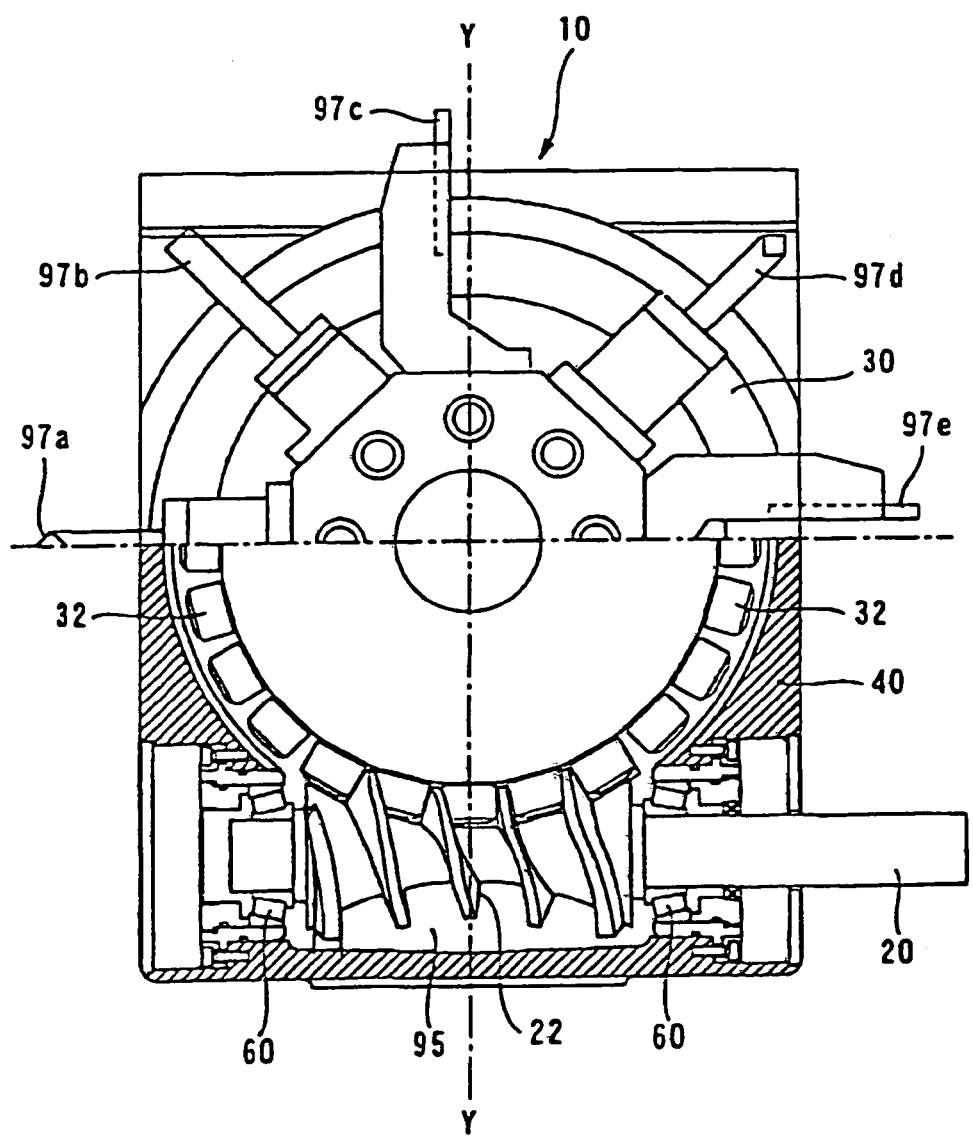
FIG. 5 is a plan view showing a structure of a table apparatus according to Embodiment 4.
Figure 6:
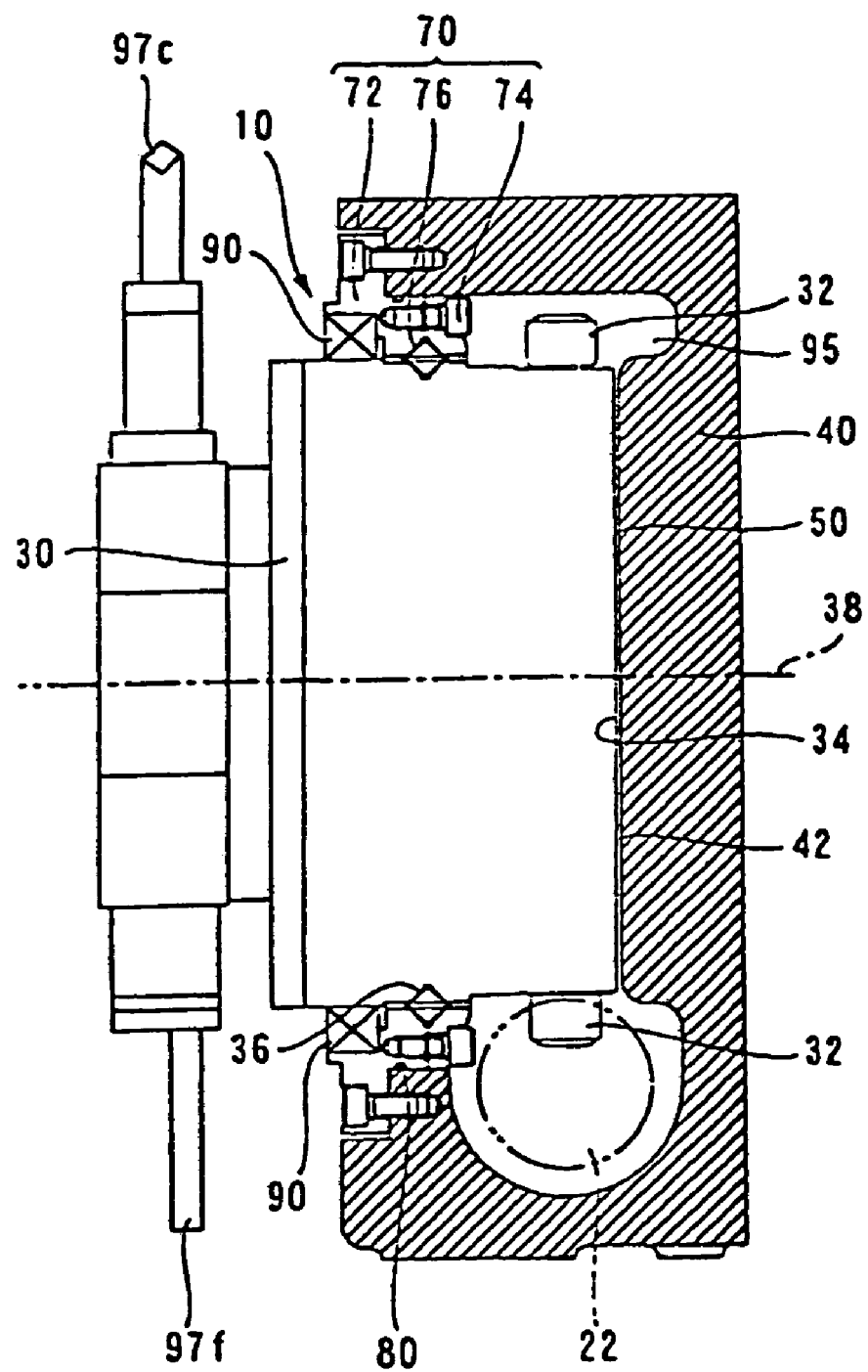
FIG. 6 is a cross sectional view along the line Y—Y in FIG. 5.

A fourth embodiment (Embodiment 4) will now be described with reference to FIGS. 5 and 6. This embodiment uses a rotating table apparatus 10 according to Embodiment 1 as a rotation moving apparatus of a tool. In this embodiment, at an end portion of a rotating table 30 opposite to an end surface 34 along the direction of the rotation shaft 38 are radially provided a plurality of tools 97a, 97b, 97c, 97d, 97e, and 97f for processing or the like of a workpiece not shown.

As a tool, there are various tools such as a screw tightening tool, a cutting tool, and a polishing tool. When processing or the like of the workpiece is performed by these tools 97a, 97b, 97c, 97d, 97e, and 97f, the tool receives an external force from the workpiece which is to be a processing object. The rotating table 30 oscillates by an action of an external force, but in this embodiment, since oil is intervened between an end surface 34 of the rotating table 30 and an opposing surface 42, and this oil functions as a damper, oscillation generated in the rotating table 30 may be swiftly dampened. Therefore, the processing precision of the workpiece may be increased.

Further, when an impact load is added during processing the workpiece, the end surface 34 of the rotating table 30 is displaced and abuts the opposing surface 42. Therefore, since the impact load may be received by not only the second bearing 70, but also by the opposing surface 42, the safety is high regarding excess weight.

Note that, in this embodiment, a plurality of tools 97a, 97b, 97c, 97d, 97e, and 97f are provided so the respective tips are faced radially outward, these tools may be provided so that the respective tips face the direction along the rotation shaft 38.

Further, the rotating table apparatus 10 according to Embodiment 2 and Embodiment 3 may be used as a rotation moving apparatus of the tool.

In particular, when a roller gear cam 22 and cam followers 32 which gear thereto are used to intermittently rotate the rotating table 30, oscillation may be swiftly dampened when the rotating table 30 is stopped and is at time of stopping, as well as no deterioration of precision in stopping caused by back-lash. Therefore, tools may be chosen with high precision, regardless of whether the rotating table 30 is rotating, is stopped and is at time of stopping, so that it is extremely effective.

Figure 7:
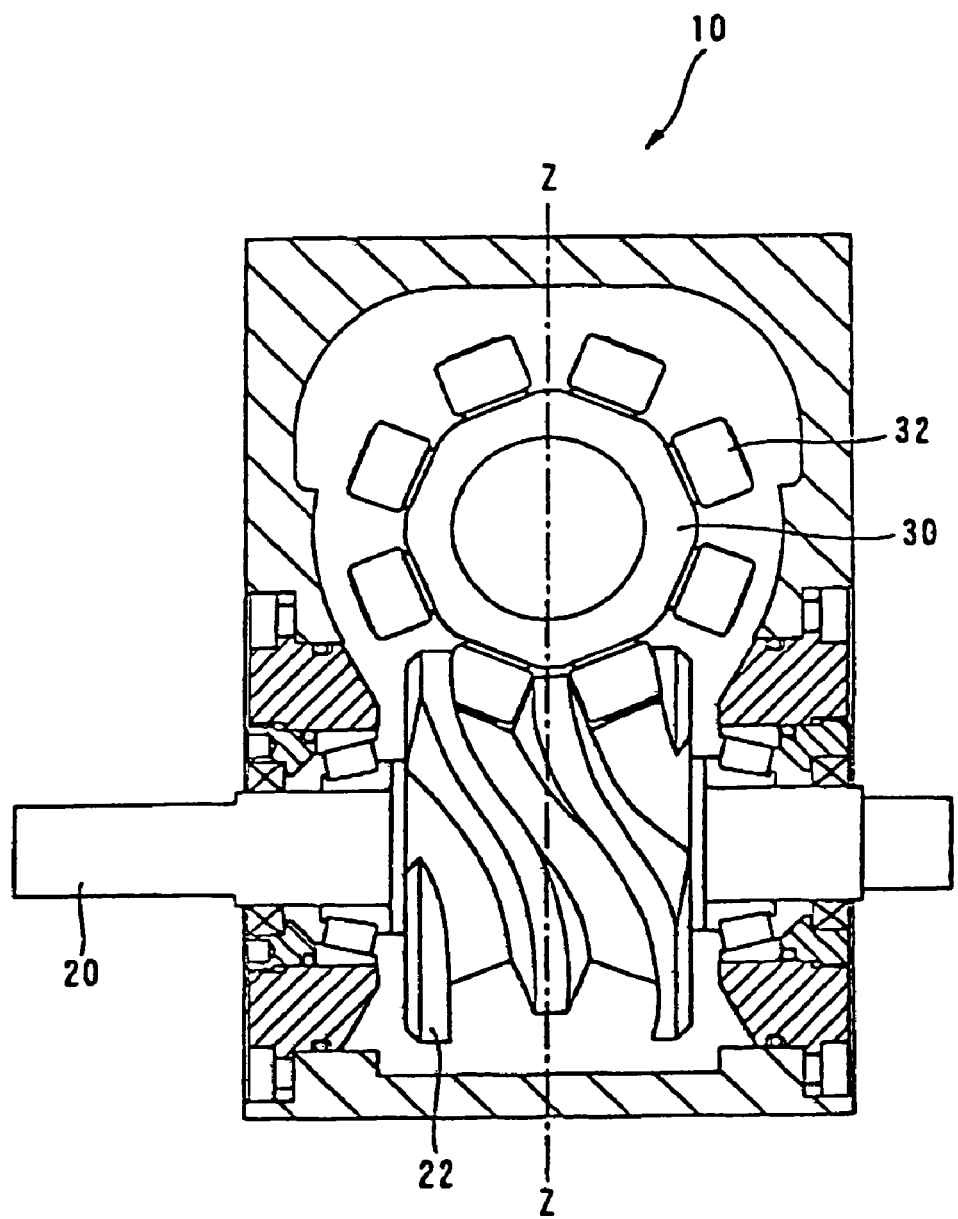
FIG. 7 is a plan view showing a structure of a table apparatus according to Embodiment 5.
Figure 8:
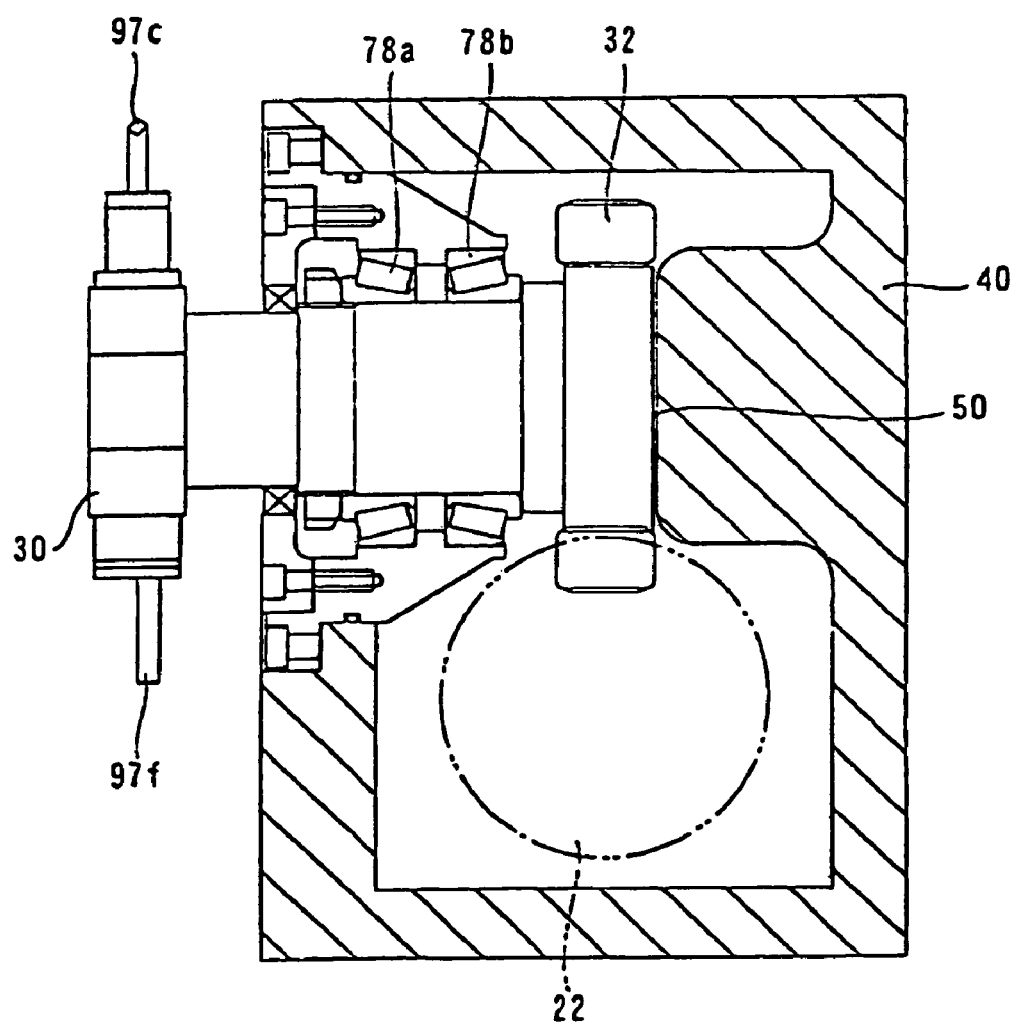
FIG. 8 is a cross sectional view along the line Z—Z in FIG. 7.

A fifth embodiment (Embodiment 5) will now be described with reference to FIGS. 7 and 8. In this embodiment, a supporting method of a rotating table 30 in respect to a housing 40 differs to that of Embodiment 4, and other structures are the same as those in Embodiment 4.

In this embodiment, in order to support the rotating table 30 in respect to the housing 40, a pair of bearings 78a and 78b is used. According to this embodiment, similarly to Embodiment 4, an oscillation generated in the rotating table 30 may be swiftly dampened when conducting processing of a workpiece. Therefore, the precision in processing of the workpiece may be increased. Further, the safety is also high regarding excess weight.

A sixth embodiment (Embodiment 6) will now be described with reference to FIGS. 9 and 10. This embodiment applies a rotating table apparatus 10 according to Embodiment 4 and Embodiment 5 to a machine tool 110.

Figure 9:
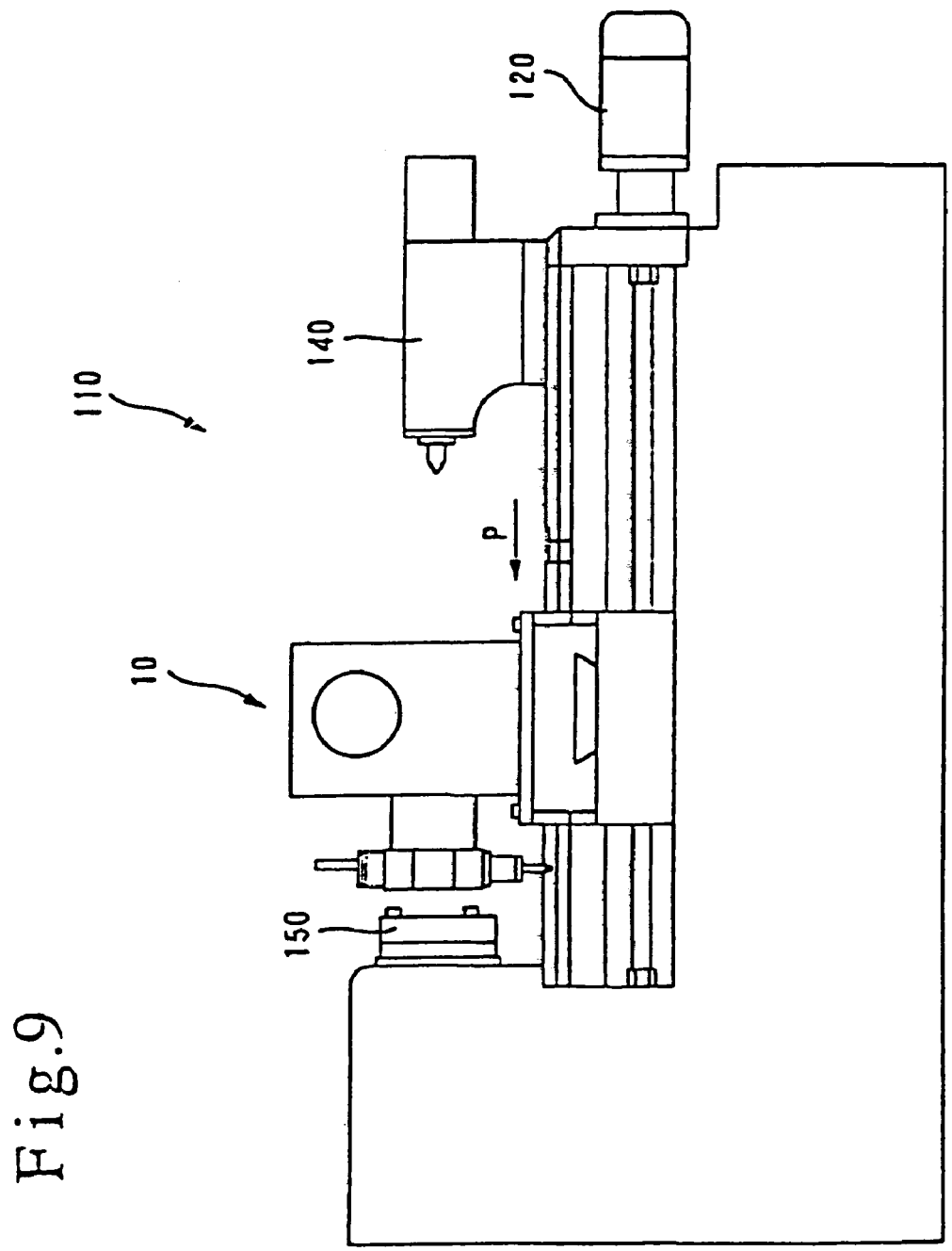
FIG. 9 is a plan view showing an applied structure of a rotating table apparatus according to Embodiment 6.
Figure 10:
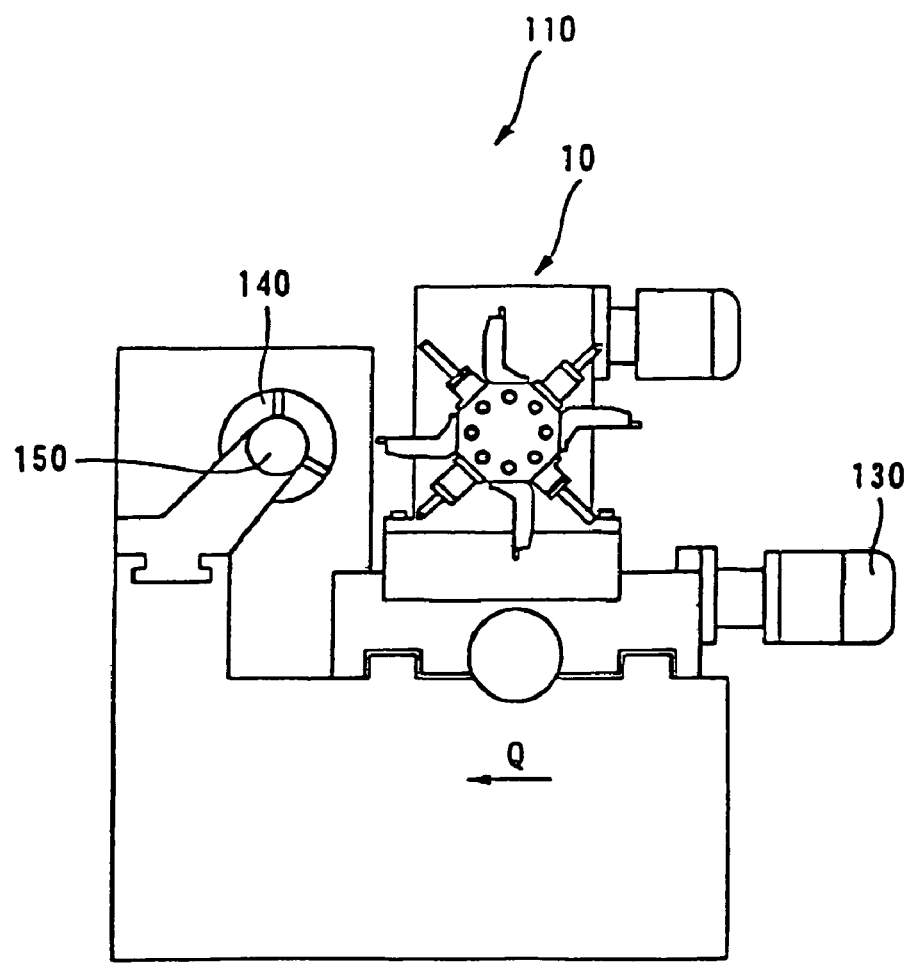
FIG. 10 is a perspective view of FIG. 9.

The rotating table apparatus 10 which comprises tools are driven by a first moving control motor 120 and a second moving control motor 130, and are movable in a P direction in FIG. 9 and a Q direction in FIG. 10 respectively.

A workpiece processed by a tool provided in the rotating table apparatus 10 is centered by a centering portion 140, and chucking is conducted by a chuck portion 150.

With a tool which is made to rotate by the rotating table apparatus 10 and which is positioned to oppose the workpiece by the first moving control motor 120 and the second moving control motor 130, the processing is conducted on the workpiece which is centered and chucked by a centering portion 140 and a chucking portion 150. The precision in processing is higher than that conventionally due to the reasons explained in Embodiment 4 and Embodiment 5.

In particular, in a case a rotating table 30 is intermittently rotated by using a roller gear cam 22 and cam followers 32 which gear thereto to choose a tool, and a workpiece W is processed by the chosen tool, the oscillation swiftly dampens when the rotating table 30 is stopped and is at time of stopping, as well as no deterioration of a precision in stopping of the rotating table 30 caused by back-lash. Thus, the tool may be chosen with high precision, and as a result the workpiece W may be processed with high precision.

Figure 11:
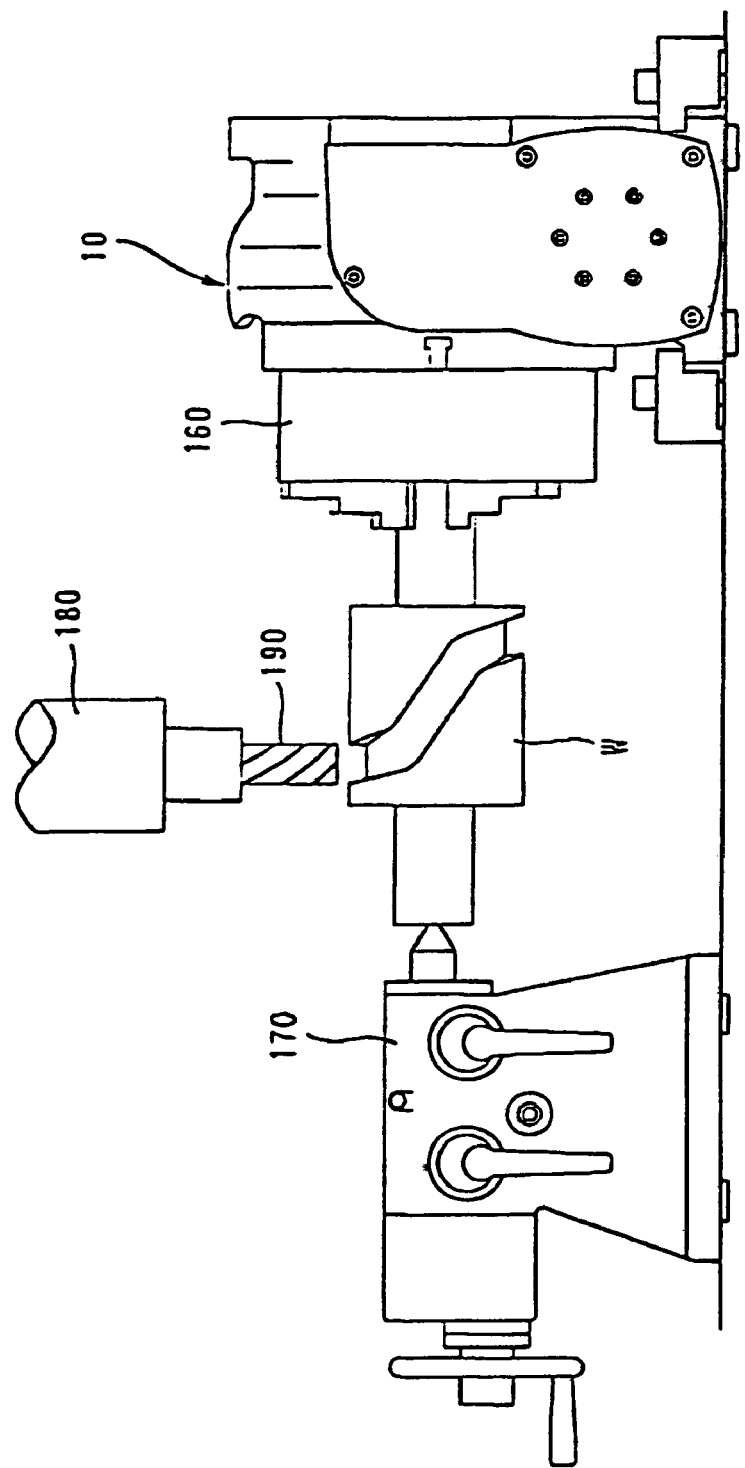
FIG. 11 is a view showing a structure of a rotating table apparatus according to Embodiment 7.

A seventh embodiment (Embodiment 7) will now be described with reference to FIG. 11. FIG. 11 is a diagram showing a structure of a rotating table apparatus according to Embodiment 7.

In the present embodiment, the rotating table apparatus 10 described in any of Embodiments 1 to 3 is provided with a chuck 160 for chucking a workpiece W which is to be a processing object. One end of the workpiece W to be the processing object is chucked by the chuck 160, and the other end is abutted to a tail stock 170, and when the rotating table apparatus 10 rotates, the chuck 160 and the workpiece W chucked by the chuck 160 also rotates. In this way processing is performed by an endmill 190 provided at an end portion of a spindle 180 to a rotating workpiece W.

When processing of the workpiece W is performed in this way, the rotating table apparatus 10 receives an external force via the chuck 160. The rotating table 30 becomes easy to oscillate by receiving the external force, but in this embodiment, oil is intervened in between an end surface 34 of the rotating table 30 and an opposing surface 42, and this oil functions as a damper, so that oscillation generated in the rotating table 30 may be swiftly dampened.

Therefore, the precision in processing of the workpiece W may be increased. Further, when an impact load is added during processing, an end surface 34 of the rotating table 30 is displaced and abuts the opposing surface 42. Thus, the impact load is received not only by a second bearing 70, but also by the opposing surface 42, so that safety is also high regarding excess weight.

Figure 12:
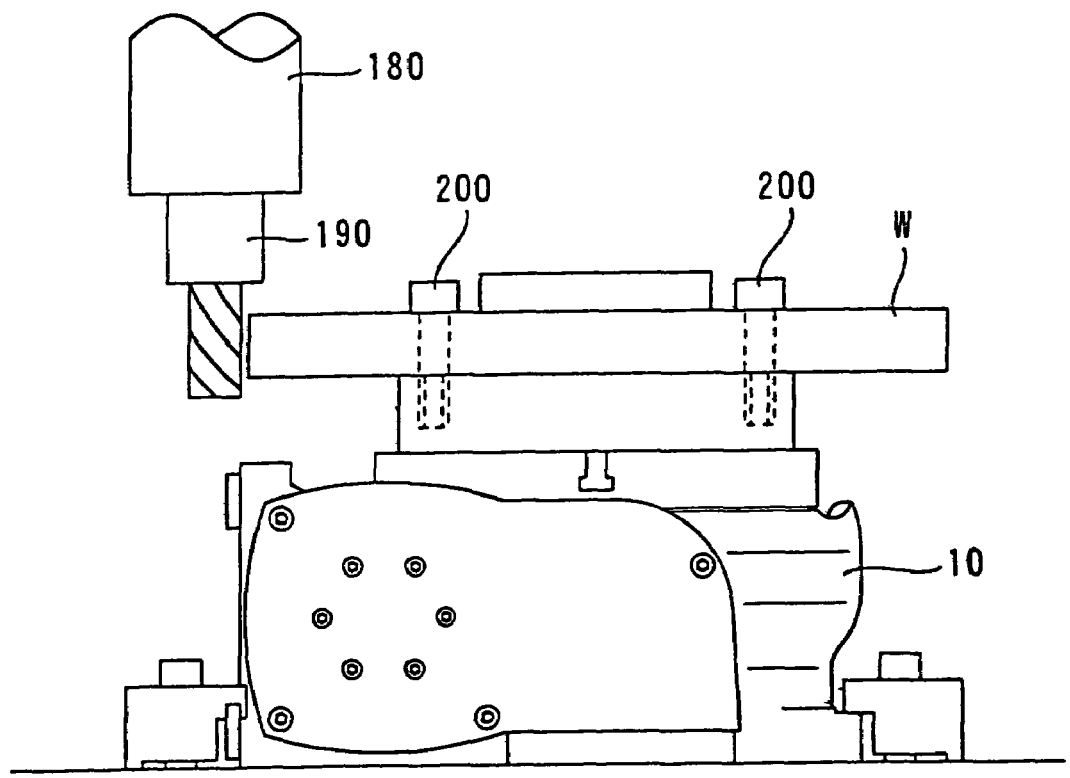
FIG. 12 is a view showing a structure of a rotating table apparatus according to Embodiment 8.

An eighth embodiment (Embodiment 8) will now be described with reference to FIG. 12.

This embodiment is a rotating table apparatus 10 described in any of Embodiments 1 to 3, attached with a workpiece W to be a processing object by bolts 200, and the workpiece W also rotates when the rotating table apparatus 10 rotates. The workpiece W which rotates in this way, is processed by an end mill 190 provided at an end of a spindle 180.

When processing of the workpiece W is conducted in this way, the rotating table apparatus 10 becomes easy to oscillate by receiving an external force. But in this embodiment, since oil is intervened between an end surface 34 of a rotating table 30 and an opposing surface 42, this oil functions as a damper, and the oscillation generated in the rotating table 30 may be swiftly dampened.

Thus, precision in processing of the workpiece may be increased. Further, when an impact load is added during processing, an end surface 34 of the rotating table 30 is displaced and abuts the opposing surface 42. Therefore, the impact load is received not only by the second bearing 70 but also by the opposing surface 42, so that safety in regards to excess weight is also high.

According to a first invention, oil intervening between an end surface of a rotating table and an opposing surface functions as a damper, and swiftly decreases an oscillation generated in the rotating table. As a result, a high precision of a rotating table apparatus may be realized.

According to a second invention, oil intervening between an end surface of a rotating table and an opposing surface functions as a damper, and most swiftly dampens an oscillation generated in the rotating table. As a result, the high precision of the rotating table apparatus may be most appropriately realized.

According to a third invention, a rotating table apparatus having the effects of the first invention and the second invention may be realized at a low cost.

According to a fourth invention, a rotating table apparatus having any of the effects of the first to the third inventions may be realized with a simple structure.

According to a fifth invention, in addition to the effects of the invention described in any of the first to the fourth inventions, there is no deterioration of a precision in stopping due to back-lash, and the oscillation swiftly dampens when the rotating table is stopped or at time of stopping, so that an intermittent rotating table apparatus with a high precision may be realized, regardless of whether the rotating table is rotating, is stopped or is at time of stopping.

According to a sixth invention, in addition to the effects described in any of the first to the fifth inventions, the oscillation of the rotating table generated when such as a workpiece is processed by a tool is swiftly dampened, and the rotating table apparatus which may increase the processing precision of the workpiece may be realized. Further, a table apparatus may be realized which is hard to break even when an impact load is provided during processing by a tool, and which is highly safe in respect to an added weight.

According to a seventh invention, in addition to the effects described in any of the first to the fifth inventions, a workpiece to be a processing object is provided in the rotating table and an oscillation of a rotating table generated when processing of the workpiece is performed may be swiftly dampened, to realize the rotating table apparatus which may increase the processing precision of the workpiece. Further, a table apparatus may be realized which is hard to break even when an impact load is added whilst processing, and is highly safe regarding too much added weight.

What is claimed is:

1. A rotating table apparatus comprising:
   a housing having a gap;
   a rotating table rotating with respect to said housing, an end surface of said rotating table opposing an opposing surface of said housing, a space being provided between said end surface and said opposing surface;
   a cam and cam followers gearing with each other in said gap and transmitting a drive force for rotating to said rotating table;
   oil contained in said gap for lubricating said cam and said cam followers, a portion of said oil flowing from said gap into said space, said portion of oil in said space being for damping oscillation of said rotating table; and
   a seal and an O-ring provided between said housing and said rotating table for preventing said oil from leaking.

2. A rotating table apparatus according to claim 1, wherein the rotation axis of said rotating table is horizontal.

3. A rotating table apparatus according to claim 1, wherein said seal prevents said oil from leaking from around a cylindrical surface of said rotating table.

4. A rotating table apparatus according to claim 1, further comprising a bearing for supporting said rotating table with respect to said housing.

5. A rotating table apparatus according to claim 4, wherein said seal is provided in parallel with said bearing.

6. A rotating table apparatus according to claim 4, wherein said cam followers are placed in a position nearer to said space than said bearing is in the direction along the rotation axis of said rotating table.

7. A rotating table apparatus according to claim 4, wherein said bearing is placed in a position nearer to said space than said cam followers are in the direction along the rotation axis of said rotating table.

8. A rotating table apparatus according to claim 1, wherein said space is from 0.005 mm to 0.2 mm.

9. A rotating table apparatus according to claim 1, wherein a tool is provided on said rotating table.

10. A rotating table apparatus according to claim 1, wherein said rotating table is provided with a chuck for chucking a workpiece which is an object to be processed.

* * * * *